E. C. SARGENT.
MILK PAIL.
APPLICATION FILED MAR. 2, 1909.

934,761. Patented Sept. 21, 1909.

Witnesses
Morris Lessin
E. M. Ricketts

Inventor
E. C. Sargent
By Watson E. Coleman
Attorney

UNITED STATES PATENT OFFICE.

ELBRIDGE C. SARGENT, OF AMENIA, NORTH DAKOTA.

MILK-PAIL.

934,761.

Specification of Letters Patent.   Patented Sept. 21, 1909.

Application filed March 2, 1909.   Serial No. 480,845.

*To all whom it may concern:*

Be it known that I, ELBRIDGE C. SARGENT, a citizen of the United States, residing at Amenia, in the county of Cass and State of North Dakota, have invented certain new and useful Improvements in Milk-Pails, of which the following is a specification, reference being had to the accompanying drawings.

This invention relates to improvements in milk pails, and its object is to provide one which will be entirely sanitary, and effectively prevent odors from the barn getting into the pail.

With the above and other objects in view, the invention consists of a pail having a removable cover containing a screen covered inlet passage for the milk and a liquid seal for such passage, whereby the pail will be substantially air tight and all dirt and odors effectively prevented from contaminating the milk.

The invention further consists in the details of construction and the combination and arrangement of parts hereinafter fully described and claimed, and illustrated in the accompanying drawings, in which—

Figure 1:
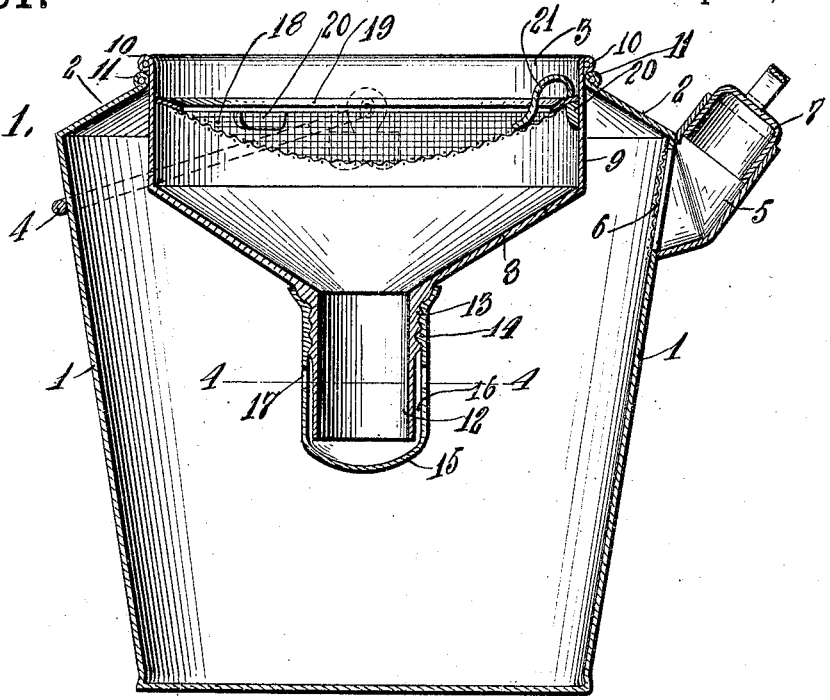
Figure 2:
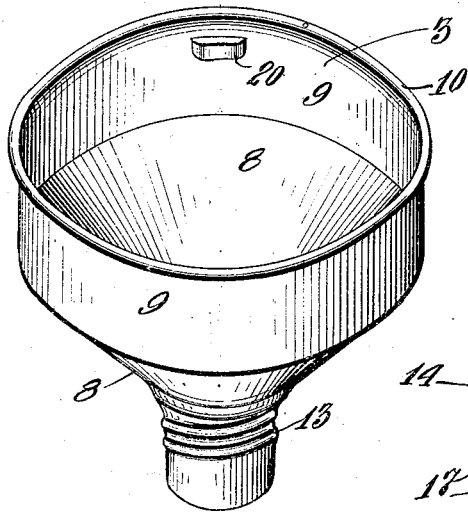
Figure 3:
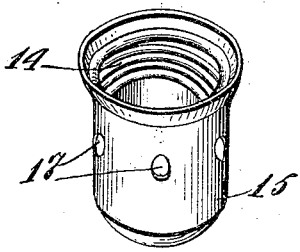
Figure 4:
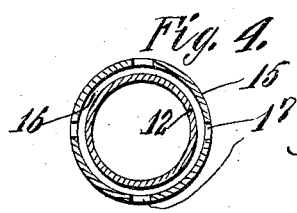

Figure 1 is a vertical sectional view through the improved milk pail; Fig. 2 is a perspective view of the cover removed from the pail; Fig. 3 is a perspective view of the cap which forms the liquid seal for the milk in the passage of the cover; and Fig. 4 is a detail horizontal section taken on the plane indicated by the line 4—4 in Fig. 1.

The invention comprises a pail having a body 1 of any suitable form and construction having at its top an upwardly and inwardly projecting neck flange 2 forming an opening to receive a removable cover 3. The body of the pail is preferably provided with the usual pivoted bail handle 4, whereby it may be conveniently carried and upon one side, adjacent to its top, is a discharge spout 5. A screen or sieve 6 extends over the lower end of the spout and its upper end is adapted to be closed by a removable cap 7, as clearly shown in Fig. 1. The removable cover 3 for the pail is funnel-shaped and consists of a cone-shaped part 8 from the large upper end of which projects a cylindrical portion or rim 9 of such diameter that the cover will snugly fit the opening in the top portion 2 of the pail and provide a substantially air tight joint. A reinforcing bead 10 surrounds the upper edge of the cover and is adapted to rest upon a similar reinforcing bead 11 on the part 2 of the bail, whereby the cover will be prevented from dropping entirely within the body of the pail. Depending from the reduced lower end of the cone portion 8 is a cylindrical tube 12 which forms an inlet passage for the milk. Said tube 12 has an open lower end and the upper portion of its exterior is externally screw threaded, as shown at 13, to receive internal screw threads 14 formed in the upper portion of a removable cap 15 adapted to form a liquid seal for the milk inlet. Said cap is in the form of a cup-like body having a closed rounded bottom and its lower or inner portion of greater internal diameter than the external diameter of the lower end of the tube 12, whereby an annular space 16 is formed between said parts, as clearly shown in Fig. 1. One or more openings 17 are formed in the cap 15 at a point above the bottom edge of the tube 12 so that liquid collecting in the bottom portion of the cap will form a liquid seal and when the liquid rises in the tube to a level above that of the openings 17 the milk will pass out of the same and into the pail. The liquid seal formed by the parts 12, 15 and the liquid in the latter will effectively prevent the odors of the barn from coming in contact with the milk in the pail and will also prevent dirt from entering the milk. To further prevent dirt from entering the pail, a removable screen or strainer 18 is arranged in the top of the cover 3. Said strainer consists of a concaved body portion of woven wire secured to an annular ring or band 19 adapted to fit within the cylindrical upper portion or flange 9 of the cover and to rest upon inwardly projecting lugs 20 formed on said portion 9, as clearly shown in Figs. 1 and 2. A finger piece 21 is provided upon the strainer whereby it may be readily lifted into and out of the cover 3. It will be noted that the bottom of the cap 15 is rounded so that there will be no sharp corners and the device may therefore be easily cleaned.

Having thus described the invention what is claimed is:

1. A milk pail comprising a body, a removable cover in the open top of the same, said cover being funnel-shaped and having a depending tubular portion with external screw threads and a removable cap to receive the lower end of the depending tubular portion of the cover, said cap having internal screw threads to engage those on said tubular portion, the closed bottom of said cap being of greater internal diameter than the external diameter of said depending tubular portion of the cover to provide an annular space between said parts and being formed at a point above the bottom edge of said depending portion with a milk outlet opening, whereby milk collecting in the bottom of the cap will form a liquid seal for said outlet openings.

2. A milk pail comprising a body having an open top, a screened discharge spout at one side of the upper portion of the body, a removable closure for said spout, a removable cover for the open top of the body, said cover having a cone-shaped portion, an upper cylindrical portion to snugly fit the opening in the top of the pail body and a tube depending from the small lower end of the cone-shaped portion, the upper part of said tube being externally screw threaded, a removable screen in the large cylindrical upper portion of the cover and a removable cap arranged upon the lower end of said tube and having an internally threaded portion to engage the external screw threads on said tube, the closed lower portion of said cap being of greater internal diameter than the external diameter of said tube to provide an annular space between said parts, and said cap being formed with milk discharge openings located at a point above the plane of the open bottom of said tube, whereby milk collecting in the bottom of the cap will form a liquid seal for said outlet openings, substantially as described and for the purpose set forth.

3. A cover for a milk pail having a funnel-shaped body and a depending tube, the latter being cylindrical and having its upper portion externally screw threaded, a removable cap arranged upon said tube and having an internally threaded upper portion to engage the screw threads on the upper portion of the tube, the closed lower portion of said cap being of greater internal diameter than the external diameter of the lower end of the tube to provide an annular space between said parts and said cap being formed with milk discharge openings located at a point above the plane of the open bottom of said tube, whereby milk collecting in the bottom of the cap will form a liquid seal for said outlet openings.

4. A cover for a milk pail comprising a funnel-shaped body having a depending tube and a cap removably arranged on the lower end of said tube and having the internal diameter of its lower portion greater than the external diameter of the lower end of said tube to provide an annular space between said parts, said cap being formed with milk outlet openings arranged in a plane above that of the open bottom of the tube, whereby the milk collecting in the bottom of the cap will form a liquid seal for said outlet openings.

In testimony whereof I hereunto affix my signature in the presence of two witnesses.

ELBRIDGE C. SARGENT.

Witnesses:
   J. F. CALLAHAN,
   MARION BURLEIGH.